Dec. 12, 1961  W. S. BUSLIK ET AL  3,012,775
SHEET CONVEYING AND ALIGNING APPARATUS
Filed Dec. 30, 1958  4 Sheets-Sheet 3

Dec. 12, 1961　　W. S. BUSLIK ET AL　　3,012,775
SHEET CONVEYING AND ALIGNING APPARATUS
Filed Dec. 30, 1958　　　　　　　　　　　　　　　　4 Sheets-Sheet 4
FIG. 4
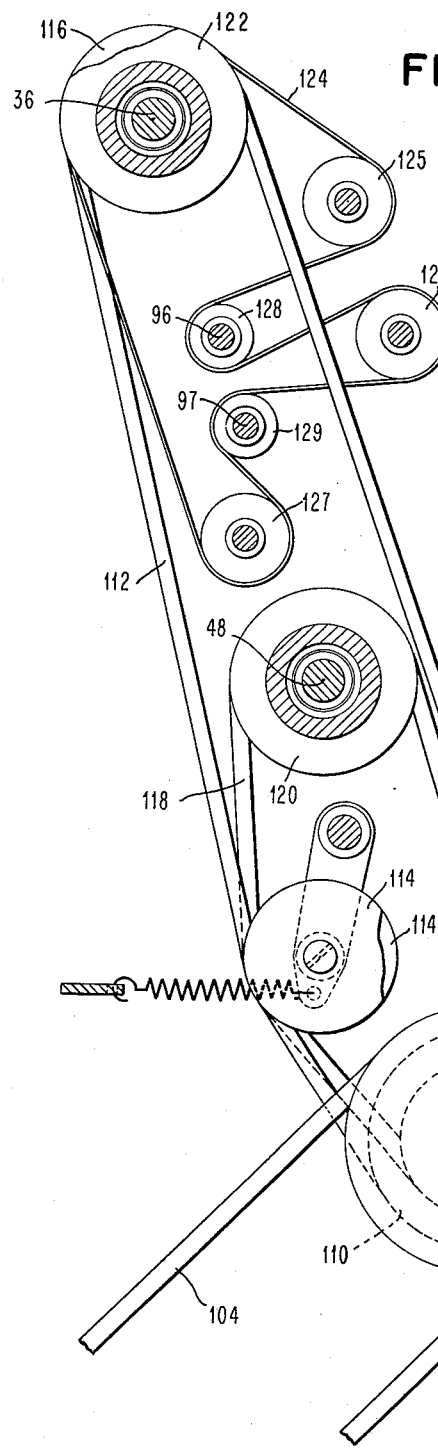
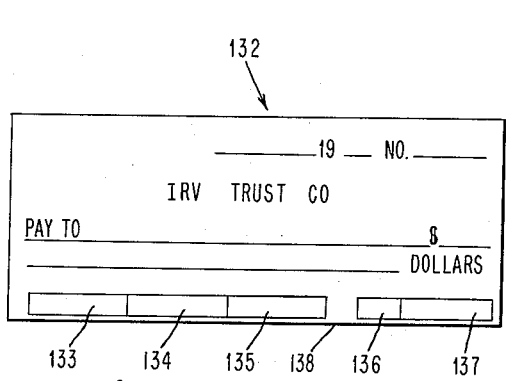
FIG. 5

United States Patent Office 3,012,775
Patented Dec. 12, 1961

3,012,775
SHEET CONVEYING AND ALIGNING APPARATUS
Walter S. Buslik and James A. Weidenhammer, Poughkeepsie, N.Y., assignors to International Business Machines Corporation, New York, N.Y., a corporation of New York
Filed Dec. 30, 1958, Ser. No. 783,881
9 Claims. (Cl. 271—52)

This invention relates to sheet conveying and aligning apparatus and more particularly to apparatus for conveying a succession of random sized sheets such as, for example, bank checks, aligning the sheets with respect to guide means adjacent to one longitudinal edge thereof and conveying the aligned sheets past scanning means positioned to scan the surface of the sheets adjacent to said edge thereof.

The present apparatus is adapted to receive a succession of separated sheets fed thereto from suitable sheet separating and feeding apparatus such as, for example, that described in the patent application of Furr et al., Serial No. 777,058, filed November 26, 1958.

It is the primary object of this invention to provide apparatus for conveying and aligning sheets and capable of handling sheets of various sizes, i.e., various lengths, widths, and thicknesses, and sheets formed of various paper stock having various thickness, hardness and surface finish, such as, for example, is encountered in the feeding of random bank checks which may be printed on papers ranging from punch card paper to light weight printing stock.

It is a further object of the invention to provide apparatus for aligning the succession of sheets with respect to one longitudinal edge thereof and for conveying aligned sheets past scanning means positioned to scan the surface of the sheets adjacent to said edge thereof in which the placement of the scanning means requires termination of the guide means, and in which the aligned sheets are maintained in their aligned position as they are conveyed beyond the termination of the guide means and past the scanning means.

It is a further object of the invention to accommodate the foregoing considerations while feeding sheets at a high rate of speed, for example, feeding sheets such as bank checks at rates up to approximately 1000 sheets per minute.

It is a further object of the invention to provide the above mentioned high speed feeding and aligning operations without damaging the sheets being fed and by means of apparatus which is capable of feeding and aligning substantial numbers of sheets without requiring replacement of any parts of the apparatus.

It is a further object of the invention to accommodate the foregoing considerations by means of apparatus requiring a minimum of space and at the same time providing free accessibility to the parts thereof for maintenance, i.e., adjustment or replacement.

Other objects of the invention will be pointed out in the following description and claims and illustrated in the accompanying drawings, which disclose, by way of example, the principle of the invention and the best mode, which has been contemplated, of applying that principle.

In the drawings:

FIGURE 4 is a vertical section taken on the trace 4—4 of FIGURE 2; and

FIGURE 5 is a showing of a bank check representative of the type of sheet which the apparatus is particularly adapted to handle.

Figure 1:
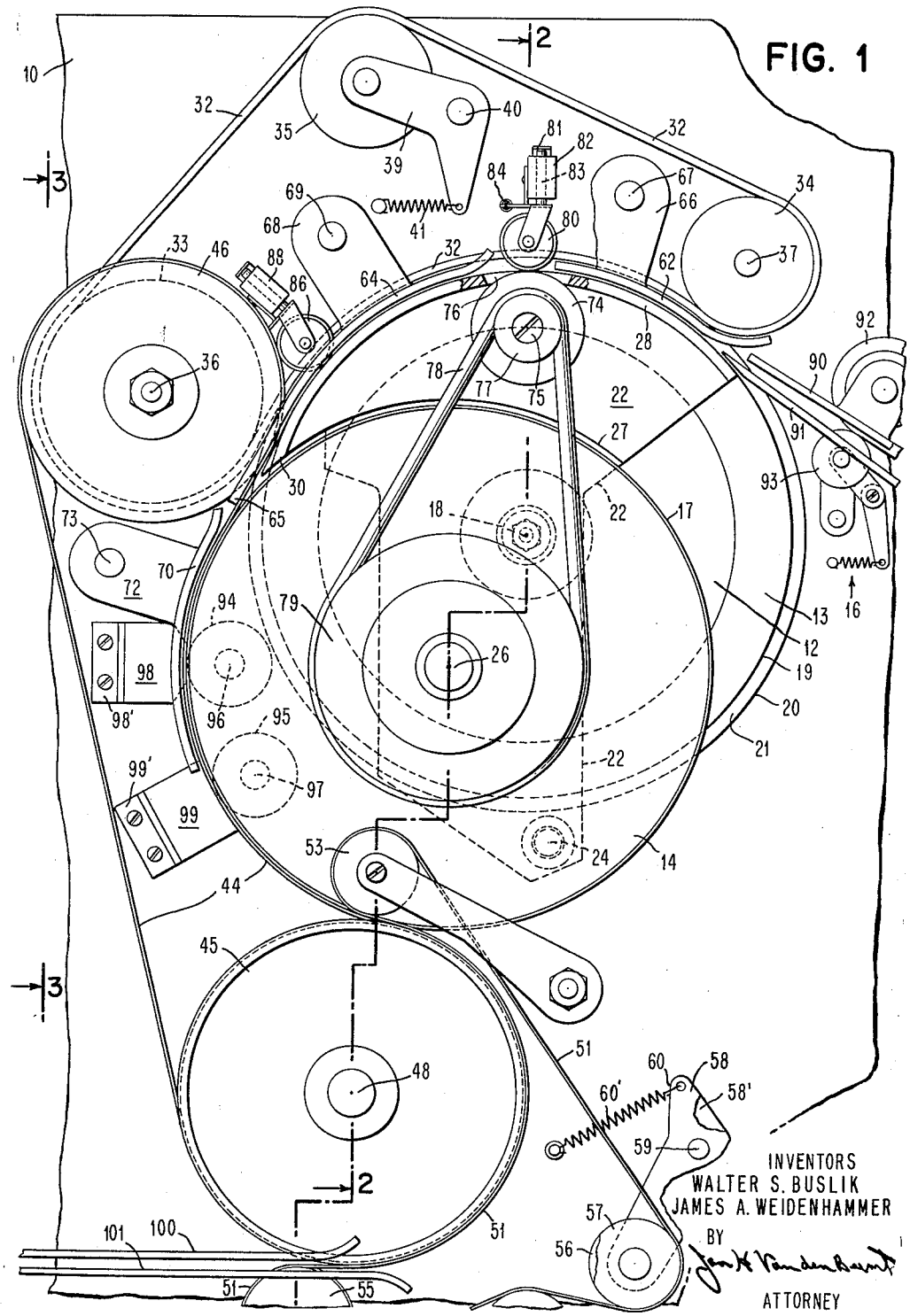
FIGURE 1 is a front elevation of apparatus embodying the invention.

Referring to the drawings, the apparatus is mounted on a vertical base plate 10 and includes a pair of discs 12 and 14 rotatably mounted in partially overlapping relation.

The disc 12 is formed with a central hub 11 rotatably mounted on a stud 18 mounted in the base plate 10. The peripheral portion of the disc 12 carries a drum forming a cylindrical flange providing a drum surface 19 extending from the right hand side of the disc 12 as viewed in FIGURES 2 and 3. The disc 12 forms a cylindrical surface 20 at the left hand side of the drum surface 19 as viewed in FIGURES 2 and 3 and forms a radially extending surface 21 between the cylindrical surface 20 and drum surface 19.

A vertically extending plate 22 is fixed to the end of the shaft 18 opposite from that mounted in the base plate 10 and is also supported by a stud 24 mounted in the base plate 10.

The disc 14 is formed with a central hub 13 rotatably mounted on a stud 26 mounted in the plate 22. The disc 14 is formed with a peripheral circumferentially extending drum forming flange 15 extending from the left side of the disc 14 as viewed in FIGURE 2 and providing a cylindrical outer surface which is coated with a high friction material 17 such as, for example, rubber.

The plate 22 is formed with an arcuate depression 27 providing clearance for the flange 15 of the disc 14 and entering within the space between the hub 11 of the disc 12 and the circumferential drum forming flange 13 thereof. The upper portion of the plate 22 is formed with an arcuate flange 28 extending to the right thereof as viewed in FIGURE 2 and having its upper surface flush with drum surface 19 of the disc 12. As will become evident upon viewing FIGURE 2, the flange 28 overlies the drum surface 17 of the disc 14 and, as will become evident from viewing FIGURE 1, the flange 28 terminates in a tangentially extending portion 30 at the location of the crossing of the drum surface 19 of the disc 12 with the drum surface 17 of the disc 14. The flange 28 thus provides a transfer guide between the surfaces of the drum 19 and the drum 17.

A belt 32 is positioned by means of pulleys 33, 34, and 35 to pass around and engage a portion of the radially outer surface 20 of the disc 12 or the upper portion thereof as viewed in FIGURE 1. The pulley 33 is affixed to a shaft 36 which is rotatably mounted in the plate 10 and is driven by means which will be hereinafter described. The pulley 34 is rotatably mounted on a shaft 37 fixed in the plate 10. The pulley 35 is rotatably mounted on one arm of a bell crank 39 which is pivotally mounted on a shaft 40 affixed to the plate 10. A spring 41 acting between the other crank arm and the base plate 10 urges the pulley 35 against the belt 32 maintaining suitable tension on the belt 32. It will be evident that if the pulley 33 is driven, the belt 32 will serve to drive the drum 19. It will be additionally noted that the belt 32 is somewhat more wide than the flange 20 and thus overlaps the surface of the drum 19 and is spaced radially outwardly therefrom.

A belt 44 passes around and is positioned by a pair of pulleys 45 and 46 and engages the drum 17 along the left hand side thereof as viewed in FIGURE 1. The pulley 46 is mounted on the shaft 36 and is driven thereby. The pulley 45 is mounted on a shaft 48 rotatably mounted in the plate 10 and driven by means which will be hereinafter described.

The shaft 36 positions the pulley 33 and 46 so as to be adjacent to the tangential portion 30 of the guide plate 22, thus the belts 32 and 44 disengage and engage their respective drums adjacent to this tangential guide.

Figure 2:
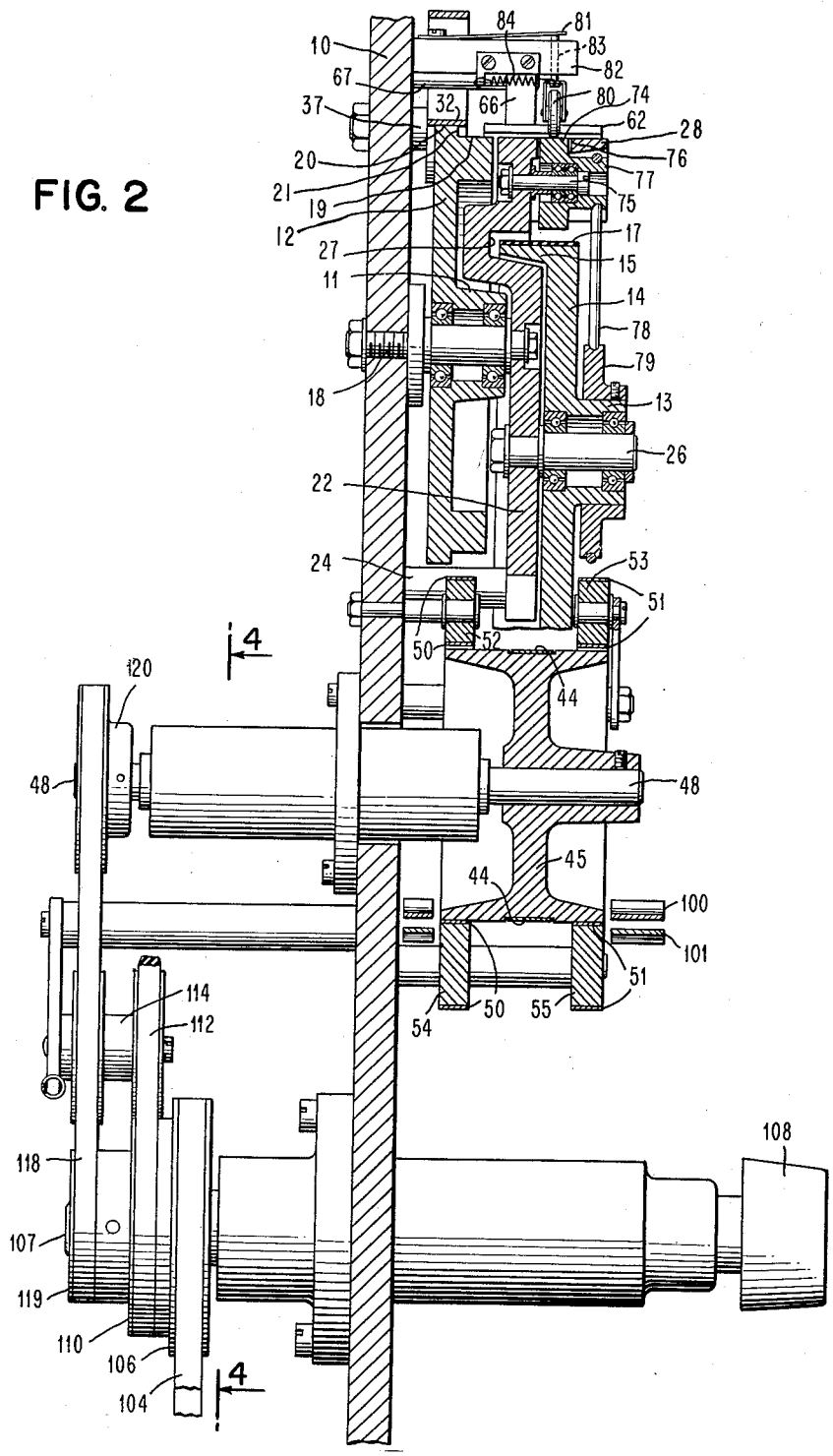
FIGURE 2 is a vertical section taken on the trace 2—2 shown in FIGURE 1.

As will become evident upon viewing FIGURE 2, the pulley 45 is provided with a circumferential central groove in which the belt 44 is recessed providing for the outer surface of the belt 44 being flush with the outer surface of the pulley 45.

A pair of belts 50 and 51 pass around the right hand portion of the pulley 45 as viewed in FIGURE 1 and are positioned adjacent to the longitudinally outer edges of the periphery thereof as shown in FIGURE 2. The belts 50 and 51 are positioned above the pulley 45 by a pair of idler rolls 52 and 53 and are positioned below the pulley 45 by a pair of idler rolls 54 and 55. The belts also pass over a pair of takeup rolls 56 and 57, respectively, which are mounted on arms 58 and 58', respectively, pivoted on a stud 59 affixed to the base plate 10 and urged by means of springs 60 and 60', respectively, to apply tension to its respective belt.

Successive guide plates 62 and 64 are positioned to and spaced above the guide flange 28 and the drum 19 in the region extending between the pulleys 34 and 33. The guide plate 62 is supported by means of a plate 66 affixed to a stud 67 mounted on the base plate 10. The guide plate 64 is supported by means of a plate 68 affixed to a stud 69 mounted on the base plate 10. It will be noted that the right hand end of the guide plate 62 viewed in FIGURE 1 extends slightly to the right of the center of the pulley 34 and the left hnd of the guide plate 64 as viewed in FIGURE 1 extends slightly to the left of the center of the pulley 33.

Figure 3:
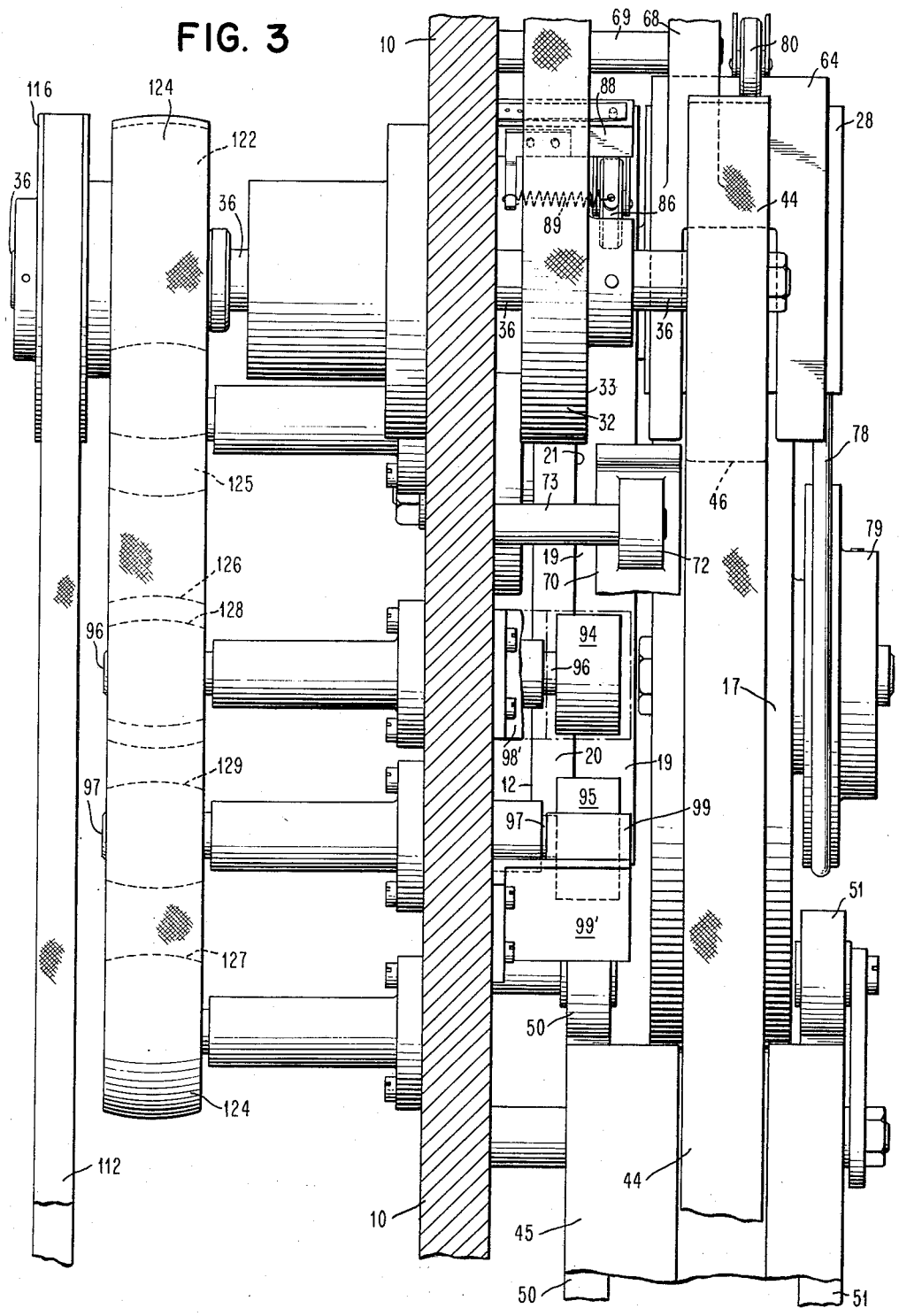
FIGURE 3 is a vertical section taken on the trace 3—3 shown in FIGURE 1.

A similar guide plate 70 is mounted adjacent to and spaced from the left hand side of the drum 17 as viewed in FIGURE 1 in the region between the pulleys 46 and 45, and extends over a portion of the region between the drum 17 and the plate 10 as will become evident from viewing FIGURE 3. The guide plate 70 is supported by means of a plate 72 affixed to a stud 73 mounted on the base plate 10.

A roller 74 is rotatably mounted on a stud 75 fixed to the upper portion of the plate 22. The roller is positioned with its upper circumferential edge flush with the upper edge of and extending through an opening 76 in the guide flange 38. The roller 74 is driven by means of a belt 78 passing around a pulley 77 on the roller 74 and a pulley 79 affixed to hub 13 on the disc 14 and driven thereby.

A caster wheel 80 is mounted above the roller 74 and positioned for contact with the uppermost edge thereof. The caster is swivel mounted by means of a shaft 83 extending rotatably through a post 82 affixed to the base plate 10. The caster wheel 80 is urged downwardly by a leaf spring 81 acting between the base plate 10 and the top of the shaft 83. A spring 84 attached between the left side of the caster shaft as viewed in FIGURE 1 and the post 82, urges the caster wheel to swivel toward the base plate 10.

It will be evident that the position of the caster wheel 80 shown in the drawings is somewhat hypothetical, i.e., with the spring acting as shown and the drum 76 rotating the caster wheel would be partially rotated toward the base plate 10 around the shaft 83 as will be hereinafter described.

A second caster wheel 86, positioned generally to the left of the caster wheel 80 as viewed in FIGURE 1, is similarly swivel mounted in a post 88 affixed to the base plate 10 and is positioned to engage the drum 17. A spring 89 tends to urge the caster wheel toward the base plate 10, i.e., to the left as viewed in FIGURE 3. Again, the caster wheel is shown in a slightly displaced position, from the position normally assumed when the apparatus is operating, as will be hereinafter described.

In operation of the apparatus, a succession of sheets is fed to the apparatus by suitable feeding means such as, for example, by a driving roll or belt 92 acting against a back-up roll 93, feeding sheets between a pair of guide plates 90 and 91 as shown in FIGURE 1. The succession of sheets is fed to the left as viewed in FIGURE 1 and each sheet passes between the guide plate 62 and the guide flange 28.

When the leading edge of a sheet engages the caster 80, which is rotating as a result of being driven by the rotating roller 74 and is slightly displaced from the position as shown in the drawings, as a result of the action of the spring 84, the sheet will be advanced by the roller 74, and directed with a sideward component of motion, as a result of the action of the caster 80, toward the radial flange 21 of the rotating drum 19. When the longitudinal edge of the sheet strikes the radial flange 21, further sideward motion of the sheet is arrested. The sheet is then advanced circumferentially around the guide plate 22 and is held in that position by the action of the caster.

The surface of the roller 74 is preferably formed of a material such as nylon having a low co-efficient of friction in order to facilitate the relative movement between the roller and sheets moving diagonally thereacross during the alignment process.

It will be evident that the position of the caster 80 will vary, with the angle between the plane of rotation of the caster 80 and the plane of rotation of the roller 74 being maximum when a sheet is being directed toward the flange 21 and being a minimum when engaging a sheet which has its longitudinal edge in engagement with the flange 21.

The relative speeds of rotation of the roller 74 and the drum 19 are such that the peripheral velocity of the drum 19 is substantially the same as the peripheral velocity of the roller 74, thus, the sheet on striking the radial flange 21, strikes a guide surface which is moving at the same rate of speed as the sheet. The absence of any resulting motion between these two engaging surfaces serves to minimize any deformation or damage occurring to the sheet and materially increases the life of the guide flange.

As the sheet is advanced, its leading edge ultimately engages the caster wheel 86. As previously noted, the caster wheel is urged to the left as viewed in FIGURE 3, by means of the spring 89 and the caster wheel is engaging the drum surface of the disc 12. Thus, if the sheet is not firmly in engagement with the radial flange 21, caster 86 will insure such engagement.

As will become evident upon viewing FIGURE 3, the caster wheel 80 is spaced a substantial distance from the flange 21 and the caster wheel 86 is positioned substantially adjacent to the flange 21. The caster wheel 80 is spaced from the flange 21 by a distance equal to slightly less than the minimum width sheet which the apparatus is adapted to handle. The spacing between the caster wheels 80 and 86 and around the periphery as viewed in FIGURE 1 is such that the shortest sheet which the machine is adapted to handle will be engaged by the caster wheel 86 before it is released by the caster wheel 80.

The result of this arrangement is such that the caster wheel 80 will engage a sheet widely spaced from the flange 21. The leading edge will be substantially in engagement with the flange 21 when it passes under the caster 86. The caster 86 by being closely positioned to the flange 21 may exert a large aligning force on the sheet without causing buckling of the sheet between the caster and the flange. Furthermore, the caster 86 provides a pivot point in the sheet around which the force exerted by the caster 80 may act to bring the trailing end of the edge of the sheet into engagement with the flange 21. Thus, the two casters serve to direct a sucession of sheets against the moving guide surface 21 insuring uniform alignment of the sheets therewith.

The belt 32 serves not only to drive the drum 19, but to provide a radially outer guide surface preventing the edges of the sheets engaging the radial flange 21 from rising upwardly and passing beyond, i.e., to the left as viewed in FIGURE 2, of the radial flange 21.

It should also be noted that the diameter of the drum 5 and the linear distance between the casters are selected, with regard to the lengths of sheets being fed, so that each sheet will extend from the supply drving means 92 to the first caster 80, and that each sheet will extend from the first caster 80 to the second caster 86. Thus, the sheets are advanced and aligned under positive control and in curved formation, i.e., wrapped around the circumference of the drum 19 and the guide flange 28. As the leading edge of each sheet advances beyond the caster 86 over the tangential portion 30 of the guide flange 28 and beneath the tangential portion 65 of the guide plate 64, it passes between the belt 44 and the drum 17 and is engaged therebetween before the trailing edge of the sheet leaves the control of the caster 86. Thus, there is substantially no possibility of the sheet moving out of its aligned position during this transfer due to the fact that there is always at least one end of the sheet curved during the transfer.

It will be noted from FIGURES 1 and 3 that belt 44 and the drum 17 are positioned a substantial distance to the right of the flange 21 on the drum 19. Thus, a portion of each sheet being fed will extend to the left of the drum 17 where it will pass under the guide plate 70 which limits outward motion of the sheet. This arrangement provides for access to both sides of the left hand edge of each sheet of a succession of aligned sheets passing over the drum 17.

In this region, there is provided a pair of rollers 94 and 95 having yielding surfaces such as, for example, soft rubber, over which the sheets pass. These rollers are mounted on rotatable shafts 96 and 97, respectively, passing through the base plate 10 and driven by means which will be hereinafter described. A pair of magnetic heads 98 and 99 are positioned adjacent to the rollers 94 and 95, respectively, and are supported by means of suitable brackets 98' and 99' respectively from the base plate 10. in FIGURE 3, the head 98 is indicated by construction lines in order to permit a more clear showing of the roller 94 and its supporting shaft 96.

From the foregoing, it will be evident that each sheet is carried around the left hand portion of the circumference of the drum 17 as viewed in FIGURE 1 and clamped between the drum and the belt 44 passing thereover. This drum and belt arrangement serves to receive a succession of aligned sheets from the drum 12 and the caster wheels 86 and 80 while maintaining the alignment of the successive sheets. Furthermore, the arrangement serves to provide for a completely exposed left hand longitudinal edge portion of the sheet, as viewed in FIGURE 3. This exposed edge portion passes over the rollers 94 and 95 and under guide plate 70. The guide plate 70 is cut away to permit the positioning of a magnetic head 98 in close proximity of the roller 94 and the guide plate 70 terminates immediately prior to the second magnetic head 99 which is positioned in close proximity to the roller 95. Thus, a succession of aligned sheets pass between the rollers 94, 95, and their respective magnetic heads, 98, 99, in accurately aligned positions with respect thereto.

The successive sheets carried by the drum 17 and the belt 44 passing thereover advance downwardly as viewed in FIGURES 1 and 3 to the vicinity of the rollers 52 and 53, at which location, hte belt 44 passes from the drum 17 to the pulley 45 and the belts 50 and 51 passing around the rollers 52 and 53, respectively, also engage the pulley 45. At this location, the successive sheets are carried away from the drum 14 and are carried around the pulley 45 externally of the belt 44 and between the belts 50 and 51 and the pulley 45. The successive sheets pass around the pulley 45 to the bottom thereof and are then advanced to the left betwen a pair of guide plates 100 and 101. At this location, the further advance of the sheet may be taken over by any suitable transport means.

The drive system for the apparatus may now be described. A belt 104 driven by a motor or other suitable driving means not shown passes over a pulley 106 affixed to and serving to drive a shaft 107 which is rotatably mounted in the plate 10 and extends to the right of the plate as viewed in FIGURE 2, i.e., to the front of the plate. A knob 108 is mounted on the front end of the shaft 107 to permit manual operation of the system if desired. A pulley 110 mounted on the shaft 107 drives a belt 112 which passes over a spring loaded take-up idler pulley 114 and around a pulley 116 on the shaft 36 serving to drive the shaft 36.

A belt 118 passing over a pulley 119 on the shaft 107 passes over a spring loaded idler pulley 114' and passes around a pulley 120 mounted on a shaft 48 serving to drive the shaft.

Thus, the shaft 36 is driven which in turn serves to drive the belt 32 and the drum 19, and the shaft 48 is driven serving to drive the belt 44 and the drum 17. As previously described, the caster back-up pulley 74 is driven from the disc 14 by means of a blet 78 and a pulley 79 mounted on the hub 13 of the disc 14.

Also mounted on the shaft 36 is a pulley 122 over which there passes a belt 124 which in turn passes over three idler pulleys 125, 126 and 127 shown in FIGURE 4. Between the idler pulleys 125, 126, the belt passes over a pulley 128 and betwen the idler pulleys 126 and 127 the belt passes over a pulley 129. The pulleys 128 and 129 are fixed to the shafts 96 and 97, respectively. These two shafts mount and drive the magnetic head back-up rollers 94 and 95, respectively.

As an example of one application for the apparatus, there is shown in FIGURE 5, generally at 132, a bank check having areas 133—137 adapted to receive numeric indicia printed in magnetic ink. In processes of automation in accounting for the banking industry, apparatus is employed for reading printed numeric characters by means of a magnetic head, and analyzing and recognition circuits receiving the outputs from the magnetic head. In order to insure the reading of magnetic characters positioned closely adjacent to the lower edge 138 of the check, it is necessary that the magnetic heads be positioned overlapping the lower edge of the check. The magnetic heads 98 and 99 are write and read heads respectively employed in such reading apparatus. In view of the fact that checks of various heights are employed, it is necessary that, when the successive checks are fed through the conveying and aligning apparatus, the checks be aligned with respect to their lower edges. The radial flange 21 of the drum 19 provides this alignment. On the other hand, when reading is to be accomplished, this aligning flange must be removed to permit the above noted overlapping of the reading head. This "removal" is accomplished by providing the aligning flange as a portion of a first rotating drum and transferring the successive sheets after alignment thereof to a second drum which serves to convey the aligned sheets past the reading head while insuring maintenance of their alignment.

A further requirement of this type of apparatus, when employed for feeding bank checks, which, as noted above, are of various sizes of sheet and are on various paper stocks, is that the apparatus must handle all of these sheets with equal facility. Furthermore, it is necessary that creased or wrinkled checks be handled. The arrangement providing for the forming of the sheets around a drum and the guiding of the sheets by guiding means on both sides of the path accommodates these various requirements while insuring reliable alignment and high speed feed.

Further problems such as problems of flutter, edge damage, and catching of split, torn, or feathered edges are also accommodated by the provision of the moving guide and conveyer means such as the moving aligning flange 21 and the moving belt and drum arrangements by which the successive sheets are conveyed.

The apparatus described is specifically designed to accommodate the foregoing considerations in conjunction with conveying and aligning of a succession of sheets of material traveling at a high rate of speed.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Sheet conveying and aligning apparatus comprising means including a first rotatable drum having a cylindrical outer surface forming a first curved conveyer for conveying a succession of sheets along a first curved path, said drum having a flange extending radially from one longitudinal side of said surface thereof forming a moving side guide for sheets traversing said first path, means for urging one edge of sheets traversing said first path into engagement with said side guide to align the sheets, a sheet scanning means, means including a second rotatable drum having a cylindrical outer surface forming a second curved conveyer for conveying a succession of sheets along a second curved path positioned to receive sheets passing from said first curved path, said second drum being positioned in partially overlapping relation with the side of said first drum opposite to that of said radial flange, and feeding means cooperating with both drum surfaces to effect a smooth direct transition of a sheet from one drum surface to the other drum surface with continuous alignment positioning, said second curved conveyer being adapted to convey sheets past said scanning means positioned to scan the surface of sheets adjacent to said edge thereof.

2. Sheet conveying and aligning apparatus comprising means forming a first curved conveyer for conveying a succession of sheets along a first curved path, means forming a moving side guide for sheets traversing said first path, means for urging one edge of sheets traversing said first path into engagement with said side guide to align the sheets, a sheet scanning means, and means forming a second curved conveyer for conveying a succession of sheets along a second curved path positioned to receive sheets passing from said first curved path, said urging means being positioned with respect to the input end of said second curved path to retain control of each sheet in said first curved path until after it has been curved in said second curved path, and said second curved conveyer being adapted to convey sheets past said scanning means positioned to scan the surface of sheets adjacent to said edge thereof.

3. Sheet conveying and aligning apparatus comprising means including a first rotatable drum forming a first curved conveyer for conveying a succession of sheets along a first curved path, said drum having a substantially radially extending flange forming a moving side guide for sheets traversing said first path, means for urging one edge of sheets traversing said first path into engagement with said side guide to align the sheets, a sheet scanning means, and means including a second rotatable drum forming a second curved conveyer for conveying a succession of sheets along a second curved path positioned to receive sheets passing from said first curved path, said second curved conveyer being adapted to convey sheets past said scanning means positioned to scan the surface of sheets adjacent to said edge thereof, said urging means including a driven roller positioned to engage one side of a sheet traversing said first path, a caster wheel positioned to engage the opposite side of a sheet traversing said first path and to act against said roller, and means urging said caster wheel to swivel toward said flange and to direct thereto an edge of the sheets traversing said path.

4. Sheet conveying and aligning apparatus comprising means including a first rotatable drum forming a first curved conveyer for conveying a succession of sheets along a first curved path, said drum having a substantially radially extending flange forming a moving side guide for sheets traversing said first path, means for urging one edge of sheets traversing said first path into engagement with said side guide to align the sheets a sheet scanning means, and means including a second rotatable drum forming a second curved conveyer for conveying a succession of sheets along a second curved path positioned to receive sheets passing from said first curved path, said second curved conveyer being adapted to convey sheets past said scanning means positioned to scan the surface of sheets adjacent to said edge thereof, said urging means including a driven roller positioned adjacent to said first drum to engage one side of a sheet traversing said first path, a first caster wheel positioned to engage the opposite side of a sheet traversing said first path and to act against said roller, means urging said caster wheel to swivel toward said flange for urging toward said flange the edges of sheets traversing said path, a second caster wheel positioned to engage one side of a sheet traversing said first path and to act against said first drum, and means urging said second caster wheel to swivel toward said flange and urge thereto the edges of sheets traversing said path.

5. Sheet conveying and aligning apparatus comprising means including a first rotatable drum having a cylindrical outer surface and stationary guide means extending flush with a portion of the circumference of said drum forming a first curved conveyer for conveying a succession of sheets along a first curved path, said drum having a flange extending radially from one longitudinal side of said surface thereof forming a moving side guide for sheets traversing said first path, means for urging one edge of sheets traversing said first path into engagement with said side guide to align the sheets, a sheet scanning means, and means including a second rotatable drum having a cylindrical outer surface forming a second curved conveyer for conveying a succession of sheets along a second curved path positioned to receive sheets passing from said first curved path, said second drum being positioned in partially overlapping relation with the side of said first drum opposite to that of said radial flange, said stationary guide means extending substantially tangentially from said first drum to and substantially tangentially of said second drum, and said second curved conveyer being adapted to convey sheets past said scanning means positioned to scan the surface of sheets adjacent to said edge thereof, whereby the overlapping relation of said second drum with the first drum effects direct transfer of a sheet without loss of alignment.

6. Sheet conveying and aligning apparatus comprising means including a first rotatable drum having a cylindrical outer surface and stationary guide means extending flush with a portion of the circumference of said drum forming a first curved conveyer for conveying a succession of sheets along a first curved path, said drum having a flange extending radially from one longitudinal side of said surface thereof forming a moving side guide for sheets traversing said first path, means for urging one edge of sheets traversing said first path into engagement with said side guide to align the sheets, a sheet scanning means, and means including a second rotatable drum forming a second curved conveyer for conveying a succession of sheets along a second curved path positioned to receive sheets passing from said first curved path, said stationary guide means extending substantially tangentially from said first drum to and substantially tangentially of said second drum, and said second curved conveyer being adapted to convey sheets past said scanning means positioned to scan the surface of sheets adjacent to said edge thereof, said urging means including a driven roller positioned adjacent to said first drum to engage one side of a sheet traversing said first path, a first caster wheel positioned to engage the opposite side of a sheet traversing said first path and to act against said roller, means urging said caster wheel to swivel toward said flange for urging toward said flange the edges of sheets traversing said path, a second caster wheel positioned to engage one side of a sheet traversing said first path and to act against said first drum, and means urging said second caster wheel to swivel toward flange for urging toward said flange the edges of sheets traversing said path.

7. Sheet conveying and aligning apparatus comprising means including a first rotatable drum having a cylindrical outer surface forming a first curved conveyer for conveying a succession of sheets along a first curved path, said drum having a flange extending radially from one longitudinal side of said surface thereof forming a moving side guide for sheets traversing said first path, means for driving said drum including a belt engaging the radially outer surface of said flange for substantially the length of said path and extending over said surface, means for urging one edge of sheets traversing said first path into engagement with said side guide to align the sheets, a sheet scanning means, and means including a second rotatable drum having a cylindrical outer surface and a belt engaging the outer surface of said second drum forming therebetween a second curved conveyer for conveying a succession of sheets along a second curved path positioned to receive sheets passing from said first curved path, said second curved conveyer being adapted to convey sheets past said scanning means positioned to scan the surface of sheets adjacent to said edge thereof.

8. Sheet conveying and aligning apparatus comprising means including a first rotatable drum having a cylindrical outer surface and stationary guide means extending flush with a portion of the circumference of said drum forming a first curved conveyer for conveying the succession of sheets along the first curved path, said drum having a flange extending radially from the longitudinal side of said surface thereof opposite to said guide means forming a moving side guide for sheets traversing said first path, means for driving said drum including a belt engaging the radially outer surface of said flange for substantially the length of said path and extending over said surface, means for urging one edge of sheets traversing said first path into engagement with said side guide to align said sheets, means including a second rotatable drum having a cylindrical outer surface and a belt engaging the outer surface of said drum forming therebetween a second curved conveyer for conveying a succession of sheets along a second curved path positioned to receive sheets passing from said first curved path, said second drum being positioned partially in overlapping relation with the side of said first drum opposite to that of said radial flange to effect a direct transfer of sheets, said stationary guide means extending substantially tangentially from said first drum to and substantially tangentially of said second drum, a sheet scanning means, and a pulley positioned adjacent to said tangentially extending portion of said guide means positioning both of said belts adjacent to said tangentially extending portion, said second curved conveyer being adapted to convey sheets past said scanning means positioned to scan the surface of sheets adjacent to said edge thereof.

9. A sheet feeding and aligning means comprising sheet feeding means including a pair of feed drums mounted with no open space between them when observed axially, the first of said drums having an extending side flange against which the sheet edges are aligned, aligning means for urging said sheets against said flange in succession, flexible belting cooperating with the surfaces of both drums to effect conveyance of a sheet from an aligned position on the first drum to the second drum which is without an extending flange, and magnetic sensing devices cooperating with the surface of a sheet while it is on said second drum, whereby through the absence of an alignment flange on said second drum it is possible for said sensing devices to hover directly over the sheet surface and be an ample width overhanging the aligned edge of the sheet.

References Cited in the file of this patent
UNITED STATES PATENTS

| | | |
|---|---|---|
| 1,628,225 | Bradshaw | May 10, 1927 |
| 2,231,914 | Huck | Feb. 18, 1941 |
| 2,674,456 | Gibson | Apr. 6, 1954 |
| 2,714,840 | Bayrer et al. | Aug. 9, 1955 |
| 2,767,982 | Noon | Oct. 23, 1956 |
| 2,877,015 | Trimble | Mar. 10, 1959 |
| 2,880,999 | Oldenboom | Apr. 7, 1959 |
| 2,905,466 | Azari et al. | Sept. 22, 1959 |
| 2,927,791 | Stern | Mar. 8, 1960 |